US006913637B2

(12) United States Patent
Kim

(10) Patent No.: US 6,913,637 B2
(45) Date of Patent: Jul. 5, 2005

(54) AIR PURIFIER

(75) Inventor: Jung-Ho Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 9 days.

(21) Appl. No.: 10/452,383

(22) Filed: Jun. 3, 2003

(65) Prior Publication Data

US 2004/0118276 A1 Jun. 24, 2004

(30) Foreign Application Priority Data

Dec. 23, 2002 (KR) ................................. 10-2002-0082693

(51) Int. Cl.[7] .......................... B01D 29/50; B01D 53/04
(52) U.S. Cl. ......................... 95/8; 95/69; 95/70; 95/90; 95/287; 96/55; 96/134; 96/417; 55/309; 55/318; 55/422; 55/471; 55/481
(58) Field of Search ..................... 95/8, 12, 69, 70, 95/79, 273, 277, 287; 96/55, 108, 224, 417, 134–136; 55/309, 311, 312, 314, 318, 422, 467, 471, 472, 481

(56) References Cited

U.S. PATENT DOCUMENTS

| | | | | |
|---|---|---|---|---|
| 1,816,836 A | * | 8/1931 | Gagen | 95/281 |
| 1,824,891 A | * | 9/1931 | Hill | 96/230 |
| 3,353,551 A | * | 11/1967 | Smale | 137/114 |
| 4,312,645 A | * | 1/1982 | Mavros et al. | 96/400 |
| 4,671,810 A | * | 6/1987 | Dietzsch et al. | 96/125 |
| 4,698,078 A | * | 10/1987 | Mavros | 96/402 |
| 4,749,385 A | * | 6/1988 | Brunner et al. | 95/273 |
| 4,833,753 A | * | 5/1989 | Muller | 15/339 |
| 4,854,950 A | * | 8/1989 | Kierzkowski et al. | 96/400 |
| 4,963,170 A | * | 10/1990 | Weber et al. | 55/311 |
| H895 H | * | 3/1991 | Weber | 95/284 |
| 5,015,451 A | * | 5/1991 | Holter et al. | 423/235 |
| 5,147,428 A | * | 9/1992 | Elliot | 55/309 |
| 5,505,768 A | * | 4/1996 | Altadonna | 96/108 |
| 5,558,158 A | * | 9/1996 | Elmore | 165/122 |
| 5,647,889 A | * | 7/1997 | Stueble | 95/20 |
| 5,683,495 A | * | 11/1997 | Derx | 96/134 |
| 6,421,238 B1 | | 7/2002 | Negishi | |
| 6,623,544 B1 | * | 9/2003 | Kaura | 95/3 |
| 2002/0144601 A1 | * | 10/2002 | Palestro et al. | 95/273 |

FOREIGN PATENT DOCUMENTS

KR   1019981074906   11/1998

* cited by examiner

*Primary Examiner*—Robert H. Spitzer
(74) *Attorney, Agent, or Firm*—Staas & Halsey LLP

(57) ABSTRACT

An air purifier includes a main body defining an air passage therein to allow sucked air to pass therethrough prior to being discharged, and a first filter installed in the main body to be switched between a closed state and an open state. The first filter removes contaminants from the sucked air in the closed state, and allows the sucked air to pass through the air passage in the open state. The air purifier may include a main body to suck and discharge air, with a bypass passage formed in the main body so that the bypass passage is opened or closed by a door, and a first filter installed in the main body. The sucked air passes through the first filter prior to being discharged when the door is closed, and passes through the bypass passage prior to being discharged when the door is opened.

31 Claims, 9 Drawing Sheets

AIR PURIFIER

CROSS-REFERENCE TO RELATED APPLICATION

This application claims the benefit of Korean Application No. 2002-82693, filed Dec. 23, 2002, in the Korean Intellectual Property Office, the disclosure of which is incorporated herein by reference.

BACKGROUND OF THE INVENTION

1. Field of the Invention

The present invention relates, in general, to air purifiers and, more particularly, to an air purifier for use in providing dean air by removing dust, bacteria and contaminants from the air.

2. Description of the Related Art

As is well known to those skilled in the art, an air purifier is used to provide purified clean air by removing dust, bacteria and contaminants from the air. The air purifier is provided with a dust collecting, unit to collect dust, and the like. In the dust collecting unit, dust particles electrically charged by corona discharge of an ionizer are collected by electrostatic attraction of a collector having a polarity opposite to a polarity of the charged dust particles.

FIG. 1 is a side sectional view of a conventional air purifier. As shown in FIG. 1, the conventional air purifier includes a pre-filter 102, an ionizer 104, a collector having horizontal partitions 106a, a HEPA (High-Efficiency Particulate Air) filter 108, and a fan 110. The pre-filter 102 acts primarily to filter relatively large dust particles sucked through the pre-filter by the fan 110. The ionizer 104 functions to charge the dust particles electrically to bear a positive. polarity by corona discharge between a discharge electrode 104b and ground electrodes 104a, positioned at both sides of the discharge electrode 104b. The collector 106 has a plurality of horizontal partitions 106a bearing a negative polarity. When the positively charged dust particles flow between the horizontal partitions 106a of the collector, the dust particles are adsorbed and collected on the negatively charged horizontal partitions by electrostatic attraction. The HEPA filter 108 functions to filter fine dust, bacteria or fungi not filtered by the horizontal partitions 106a of the collector.

However, in the conventional air purifier, the HEPA filter functioning to filter microparticles, such as fine dust, bacteria or fungi, must have a microstructure necessary for filtering the microparticles, so the HEPA filter generates high resistance against air currents circulated through the air purifier, and thus causes a high degree of air pressure loss, even though the HEPA filter has high air-purifying efficiency. Due to the high degree of air pressure loss caused by the HEPA filter, purified air cannot be distributed to areas distant from the air purifier. In addition, the amount of impurities deposited on the HEPA filter are increased as operating time goes by, so that the air pressure loss caused by the HEPA filter with the impurities is increased. Therefore, the problem of air pressure loss caused by the HEPA filter worsens as the operating time of the air purifier increases. When air pressure in the air purifier is forcibly increased in an effort to solve the problem of air pressure loss caused by the HEPA filter, operational noise of the air purifier is undesirably increased, disturbing people near the air purifier.

SUMMARY OF THE INVENTION

Accordingly, it is an aspect of the present invention to provide an air purifier which is designed to discharge air directly to a room without forcing the air to pass through a HEPA filter when the level of contamination in the air, such as dust particles, is determined to be sufficiently low, thus minimizing air pressure loss and attenuating operational noise caused by the HEPA filter, through which the air generally passes.

Additional aspects and advantages of the invention will be set forth in part in the description which follows and, in part, will be obvious from the description, or may be learned by practice of the invention.

The foregoing and/or other aspects of the present invention are achieved by providing an air purifier, including a main body defining an air passage therein to allow sucked air to pass therethrough prior to being discharged, and a first filter installed in the main body to be switched between a closed state and an open state, the first filter removing contaminants from the sucked air in the closed state and allowing the sucked air to smoothly pass through the air passage in the open state.

The foregoing and/or other aspects of the present invention are achieved by providing an air purifier, including a main body defining an air passage therein to allow sucked air to pass therethrough prior to being discharged, with a bypass passage being formed in the main body so that the bypass passage is opened or closed by a door, and a first filter installed in the main body to remove contaminants from the sucked air, wherein the sucked air passes through the first filter prior to being discharged from the main body when the door is dosed, and passes through the bypass passage prior to being discharged from the main body when the door is opened.

BRIEF DESCRIPTION OF THE DRAWINGS

These and/or other aspects and advantages of the invention will become apparent and more readily appreciated from the following description of the preferred embodiments taken in conjunction with the accompanying drawings of which.

DETAILED DESCRIPTION OF THE PREFERRED EMBODIMENTS

Figure 1:
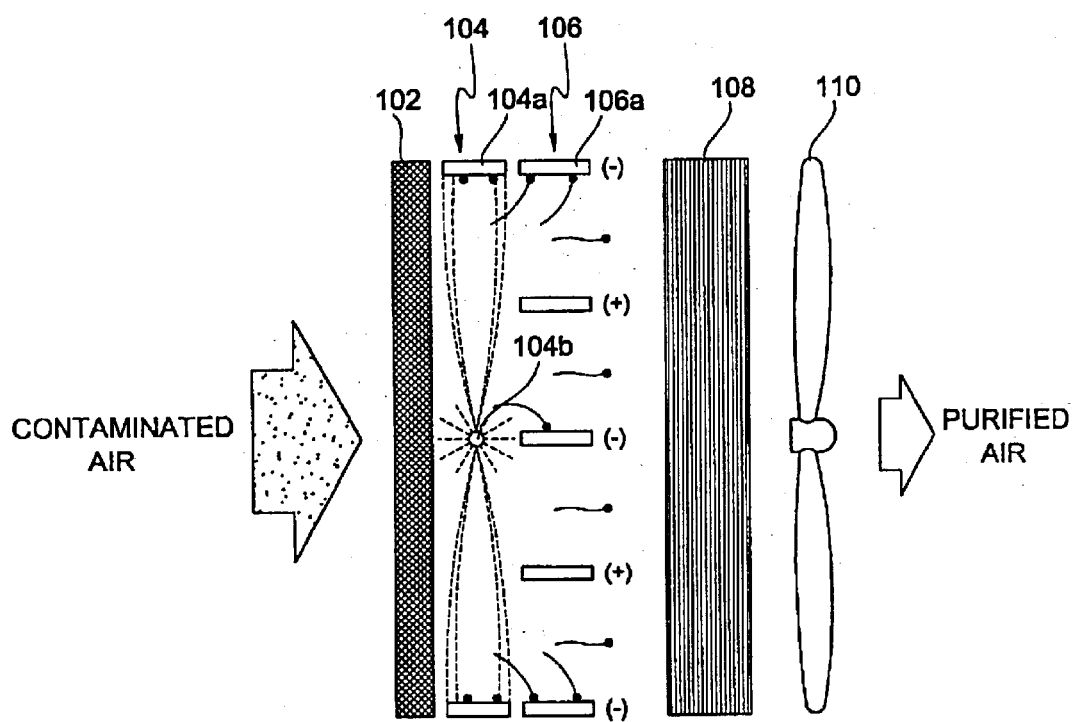
FIG. 1 is a side sectional view of a conventional air purifier.

Reference is made below in detail to the present preferred embodiments of the present invention, examples of which are illustrated in the accompanying drawings, wherein like reference numerals refer to like elements throughout.

Figure 2:
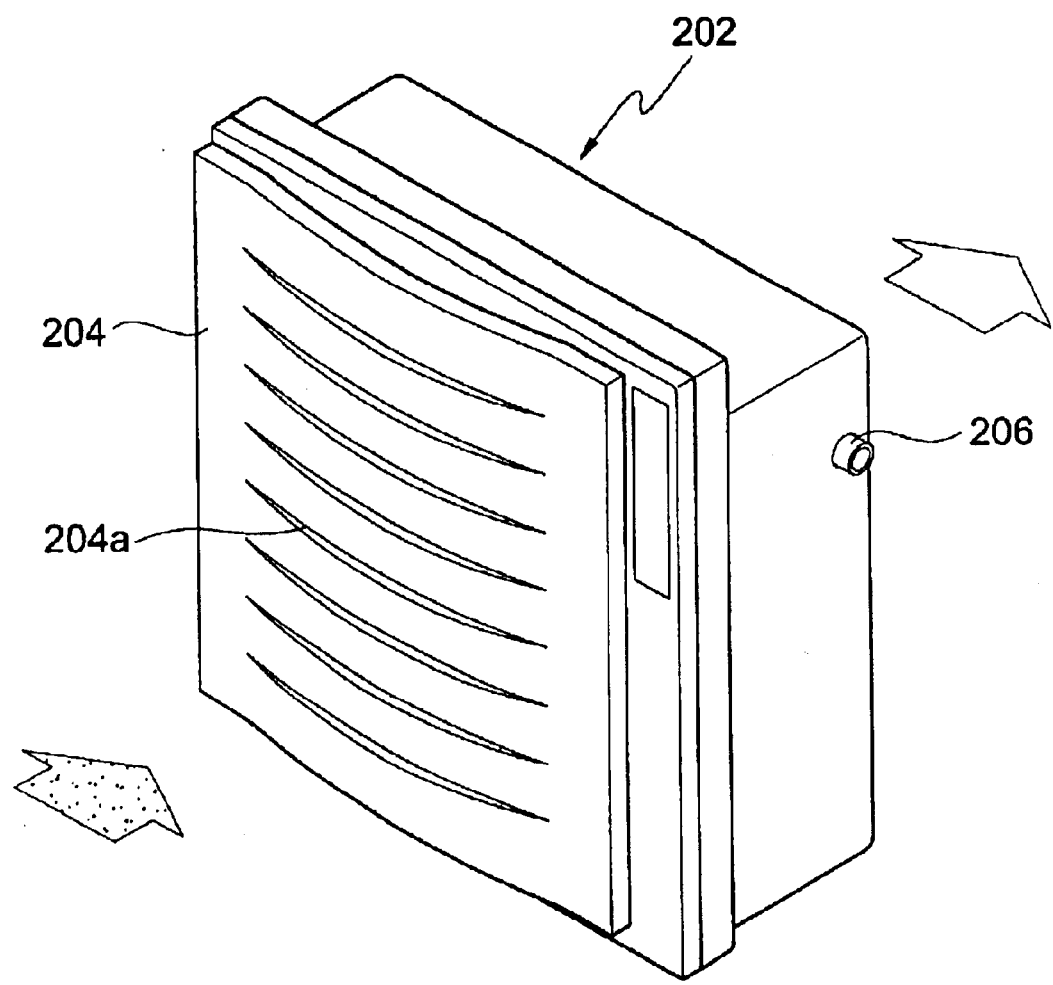
FIG. 2 is a perspective view of an air purifier, according to a first embodiment of the present invention.

Embodiments of an air purifier according to the present invention are described in detail with reference to FIGS. 2 to 9. FIG. 2 is a perspective view of an air purifier, according to a first embodiment of the present invention. As shown in FIG. 2, a main body 202 of the air purifier is equipped with a cover 204 at a front surface thereof, in which the cover 204 is formed with a plurality of air suction slits 204a so that external air is sucked into the main body 202. That is, through the air suction slits 204a, contaminated air is sucked into the main body 202 which functions to remove contaminants, such as dust particles, hazardous components and offensive odors, thus purifying the contaminated air. The purified air is discharged through an air exhaust port (not shown) positioned at a back surface of the main body 202 to the outside of the air purifier. At a side surface of the main body 202, a contamination level sensor 206 is mounted to determine the contamination level of air inside a room having the air purifier. The contamination level sensor 206 irradiates a light beam into the air, and determines the number and size of dust particles passing through the light beam, thus sensing the contamination level of the air. Of course, it should be understood that another method in place of the method using the contamination level sensor may be used with the air purifier without affecting the functioning of the present invention, if said method can determine the contamination level of air.

Figure 3:
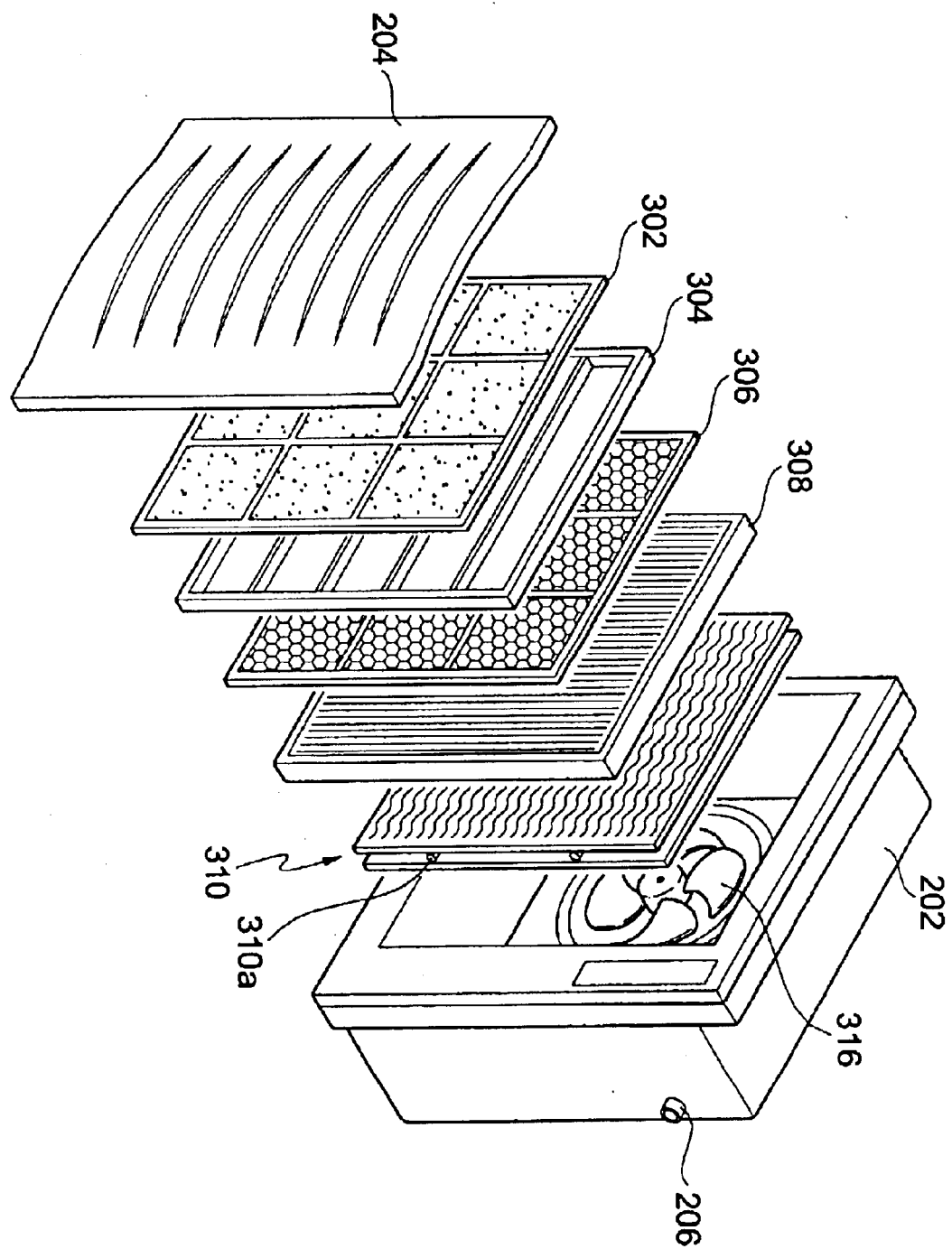
FIG. 3 is an exploded perspective view of the air purifier of FIG. 2.

The air purifier of the present invention also includes a variety of dust filtering and collecting units used to purify air. FIG. 3 is an exploded perspective view showing the construction of the air purifier of FIG. 2. As is shown in the drawing, the air purifier according to the present invention includes a pre-filter 302, an ionizer 304, a collector 306, a HEPA filter 308, and photocatalytic filters 310, sequentially disposed from the front to the back of the main body 202. Further, a fan 316 is installed at the very rear of the main body 202 to circulate air forcibly from the front to the back of the main body 202. When the fan 316 is rotated, air flows from the front to the back of the main body 202, so that room air is circulated through the air purifier under constant pressure.

The dust filtering and collecting units shown in FIG. 3 function as follows. The pre-filter 302 is used primarily to filter relatively large dust particles. The ionizer 304 and the collector 306 serve as an electric dust collecting unit, in which dust particles, being positively charged in the ionizer 304, are adsorbed and collected by the negatively charged collector 306 via electrostatic attraction. The dust particles remaining in the air after passing through the collector 306 are filtered through the HEPA filter 308. That is, the HEPA filter 308 is used to collect microparticles, such as fine dust, bacteria, fungi or ticks having very small particle size, for example, as small as monodispersed, aerosolized DOP (di-octyl-phthalate) droplets (e.g., about 0.3 $\mu$m), so the HEPA filter 308 has a microstructure which is fabricated by using ultrafine fibers. The photocatalytic filters 310 act as deodorizing filters which eliminate odors from air through reaction of a chemical material coated on the photocatalytic filters 310 with ultraviolet rays generated by ultraviolet lamps 310a positioned between the filters 310.

When the contamination level of room air to be processed by the air purifier is high, it is necessary to remove microparticles from the air by using the HEPA filter 308. In such a case, air pressure loss is caused due to the microstructure of the HEPA filter 308 when the air passes through the HEPA filter 308. In addition, the HEPA filter 308 generates operational noise while air passes therethrough. Therefore, when the contamination level of room air is lower than a predetermined reference level, it is preferable to open the HEPA filter 308 to minimize the air pressure loss and attenuate the operational noise of the air purifier. When the room air is repeatedly processed by the air purifier such that the contamination level of the air is reduced to a point lower than the reference level, the air purifying effect provided by the HEPA filter 308 is reduced. In such a case, the HEPA filter 308 may not participate in the air purifying process continuously. In the air purifier, the photocatalytic filters 310, acting as deodorizing filters, are installed behind the HEPA filter 308. The photocatalytic filters 310 eliminate odors from air through a reaction of a chemical material coated thereon with ultraviolet rays. In the air purifier of the present invention, the photocatalytic filters 310 may be designed to be opened as desired in the same manner as that described for the HEPA filter 308, thus enhancing the effect of minimizing the air pressure loss and attenuating the operational noise of the air purifier. Furthermore, all the filters installed in the air purifier of the present invention may be configured to be opened when necessary.

Figure 4A:
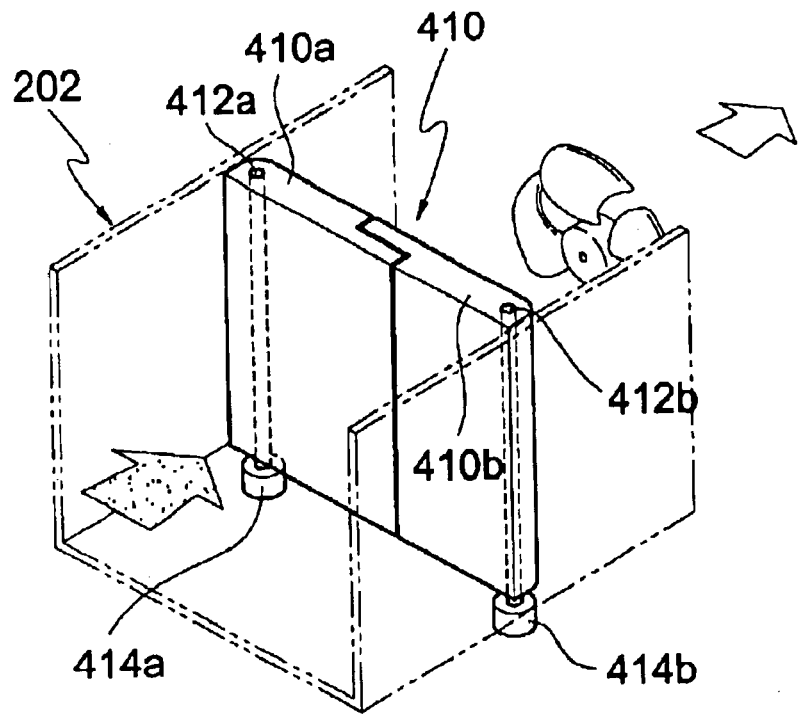
FIGS. 4A and 4B are views illustrating the construction and operation of an openable HEPA filter included in the air purifier of FIG. 2.
Figure 4B:
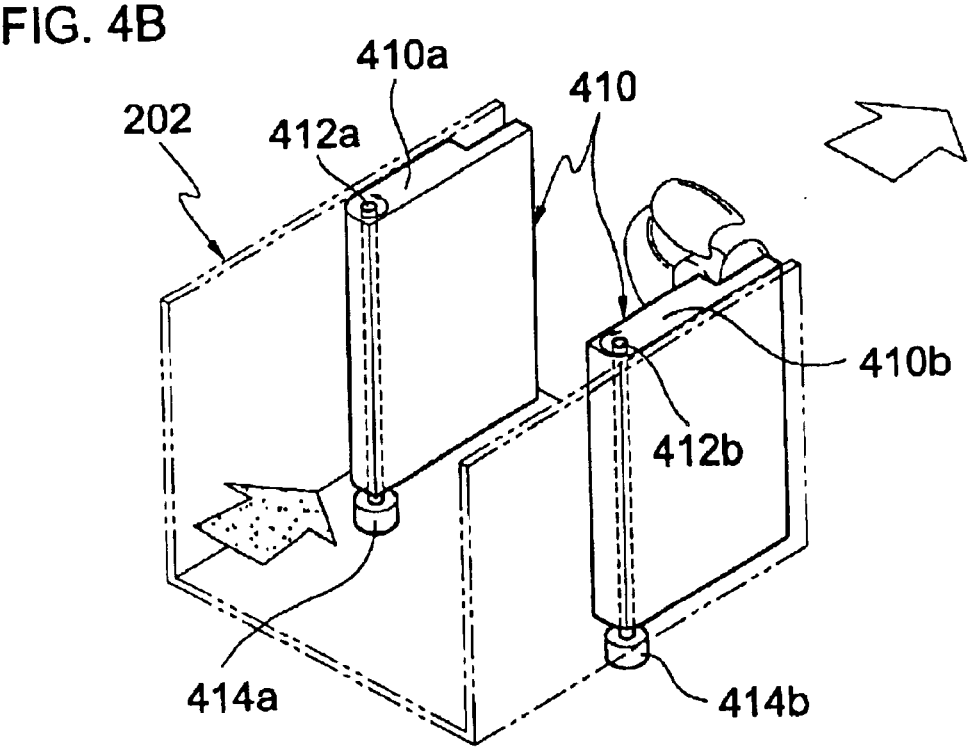

FIGS. 4A and 4B are views illustrating the construction and operation of an openable HEPA filter included in the air purifier of the first embodiment. As shown in FIG. 4A, the HEPA filter 410 includes two parts, that is, first and second filter parts 410a and 410b which are installed in the main body 202 by rotating shafts 412a and 412b provided along side ends of the two filter parts 410a and 410b, so that the two filter parts 410a and 410b are rotated around the two rotating shafts 412a and 412b, respectively. The two rotating shafts 412a and 412b are rotated by drive motors 414a and 414b, respectively. Of course, it should be understood that the rotating structure for the two filter parts 410a and 410b may be accomplished by another-type hinge mechanism. Even though the HEPA filter 410 is divided into the first and second filter parts 410a and 410b, the HEPA filter 410 effectively provides the desired air purifying effect since the two filter parts 410a and 410b are configured to overlap each other at facing ends thereof. In a closed state where the HEPA filter 410 is closed as shown in FIG. 4A, the HEPA filter 410 collects microparticles, such as fine dust, bacteria, fungi or ticks from air passing through the main body 202. Of course, in the closed state of the HEPA filter 410, air pressure loss may be caused by the HEPA filter 410. However, when the contamination level of room air is high, it is preferable to control the air purifier to allow the air to pass through the HEPA filter 410 and supply sufficiently purified air to a room while being subjected to air pressure loss caused by the HEPA filter 410.

When the contamination level of the room air is sufficiently reduced due to a repeated air purifying process of the air purifier, it is more preferable to maintain air pressure at a high level to uniformly discharge purified air to the four corners of the room, rather than further purifying the air. Therefore, once the contamination level of the room air is sufficiently reduced to a level not higher than a predetermined reference level, due to the repeated air purifying process of the air purifier, the first and second filter parts 410a and 410b are rotated around the rotating shafts 412a and 412b in opposite directions at predetermined angles. The HEPA filter 410 is thus opened as shown in FIG. 4B. In such a case, air pressure loss caused by the HEPA filter 410 is not a factor during circulation of air from the front to the back of the main body 202.

Figure 5A:
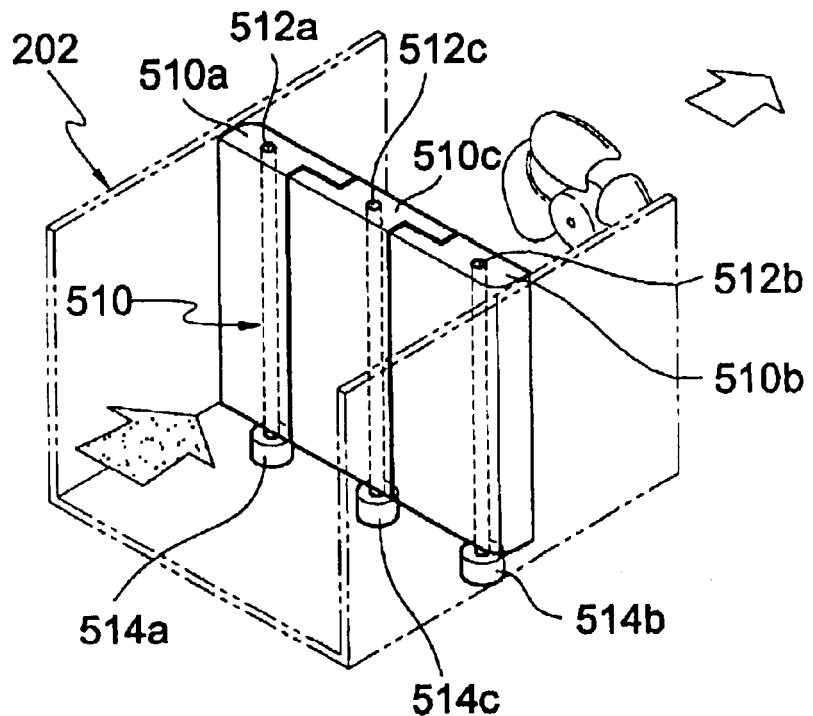
FIGS. 5A and 5B are views illustrating the construction and operation of an openable HEPA filter, according to a modification of the first embodiment of the present invention.
Figure 5B:
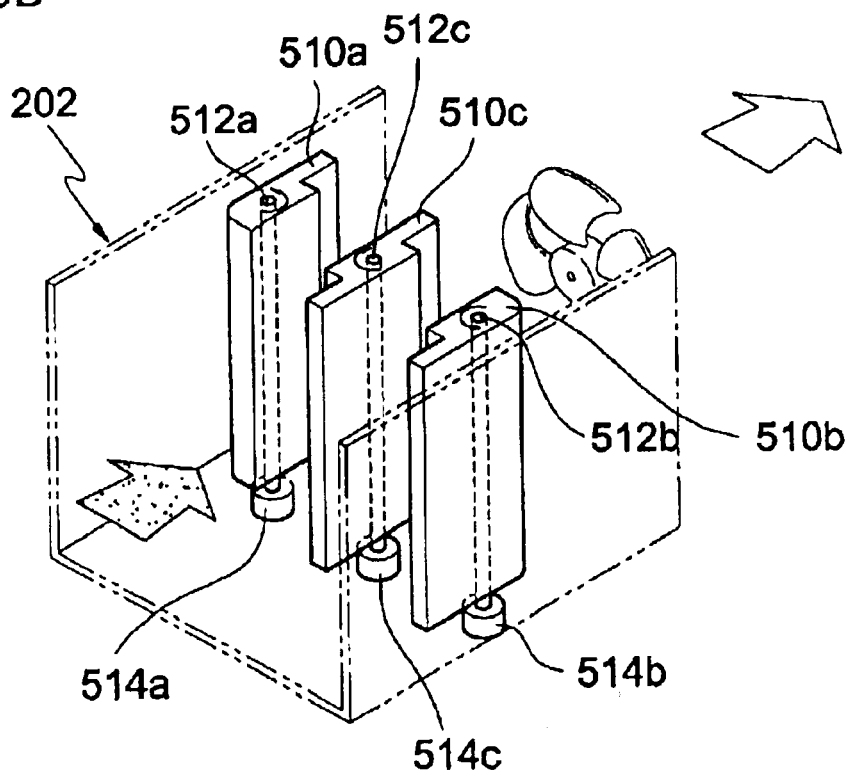

FIGS. 5A and 5B are views illustrating the construction and operation of an openable HEPA filter, according to a modification of the first embodiment of the present invention. As shown in FIG. 5A, the HEPA filter 510 includes three parts, that is, first, second and third filter parts 510a, 510b and 510c which are installed in the main body 202 by rotating shafts 512a, 512b and 512c provided along middle portions of the three filter parts 510a, 510b and 510c, so that the three filter parts 510a, 510b and 510c are rotated around the three rotating shafts 512a, 512b and 512c, respectively. The three rotating shafts 512a, 512b and 512c are rotated by drive motors 514a, 514b and 514c, respectively. When the contamination level of room air is high, it is preferable to control the air purifier to allow the air to pass through the HEPA filter 510 and supply sufficiently purified air to a room while being subjected to air pressure loss caused by the HEPA filter 510. In such a case, the three filter parts 510a, 510b and 510c of the HEPA filter 510 are closed to accomplish a closed state of the HEPA filter 510, in which the HEPA filter 510 participates in the air purifying process, as shown in FIG. 5A.

However, when the contamination level of the room air is sufficiently reduced due to a repeated air purifying process of the air purifier, the three filter parts 510a, 510b and 510c are rotated at predetermined angles, thus opening the HEPA filter 510 as shown in FIG. 5B. In such a case, air pressure loss caused by the HEPA filter 510 is not a factor during circulation of air from the front to the back of the main body 202.

Figure 6A:
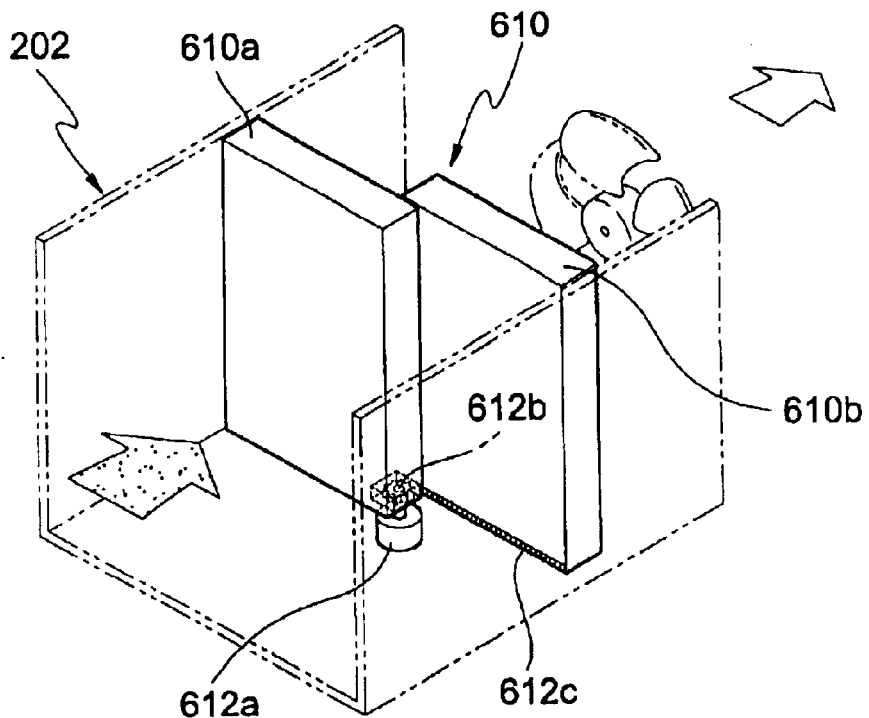
FIGS. 6A and 6B are views illustrating the construction and operation of an openable HEPA filter, according to another modification of the first embodiment of the present invention.
Figure 6B:
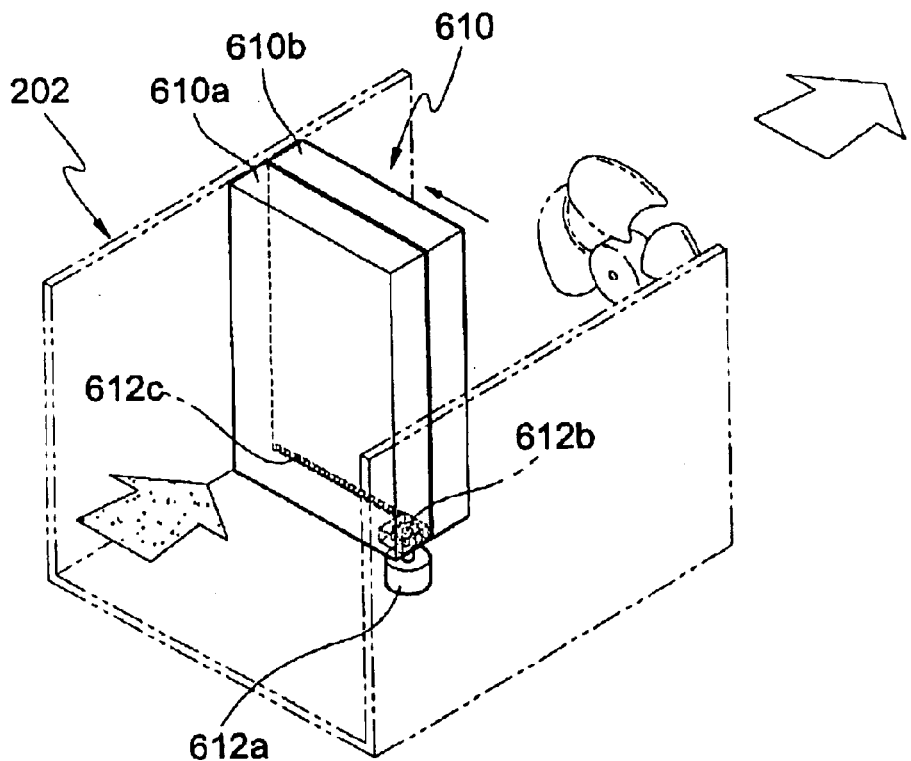

FIGS. 6A and 6B are views illustrating the construction and operation of an openable HEPA filter, according to another modification of the first embodiment. As shown in FIG. 6A, the HEPA filter 610 includes two parts, that is, first and second filter parts 610a and 610b. The HEPA filter 610 is opened or closed by a horizontal reciprocation of the second filter part 610b, relative to the first filter part 610a, in a direction parallel to the first filter part 610a. A pinion seating recess is formed at a lower surface of the first filter part 610a, and receives therein a pinion 612b rotated by a drive motor 612a. The pinion seating recess of the first filter part 610a is opened toward the second filter part 610b. A rack 612c is horizontally provided along a lower portion of the second filter part 610b at a surface facing the first filter part 610a, and engages with the pinion 612b. When the pinion 612b is rotated in either direction by the drive motor 612a, a rotating action of the pinion 612b is converted into a linear moving action by the rack 612c, so that the second filter part 610b is linearly moved in parallel to the first filter unit 610a to be opened or closed. That is, when the contamination level of room air is higher than a predetermined reference level, the second filter part 610b is closed to accomplish a closed state of the HEPA filter 610 as shown in FIG. 6A, so that the HEPA filter 610 participates in an air purifying process of the air purifier. However, when the contamination level of the room air is sufficiently reduced due to a repeated air purifying process of the air purifier, the second filter part 610b is opened as shown in FIG. 6B thus opening the HEPA filter 610. In such a case, air pressure loss caused by the HEPA filter 610 is not a factor during circulation of air from the front to the back of the main body 202. When the HEPA filter 610 is opened or closed through a sliding mechanism as shown in FIGS. 6A and 6B, it is possible to preferably and remarkably reduce an area consumed by the HEPA filter 610 during an action of being opened or closed.

Figure 7:
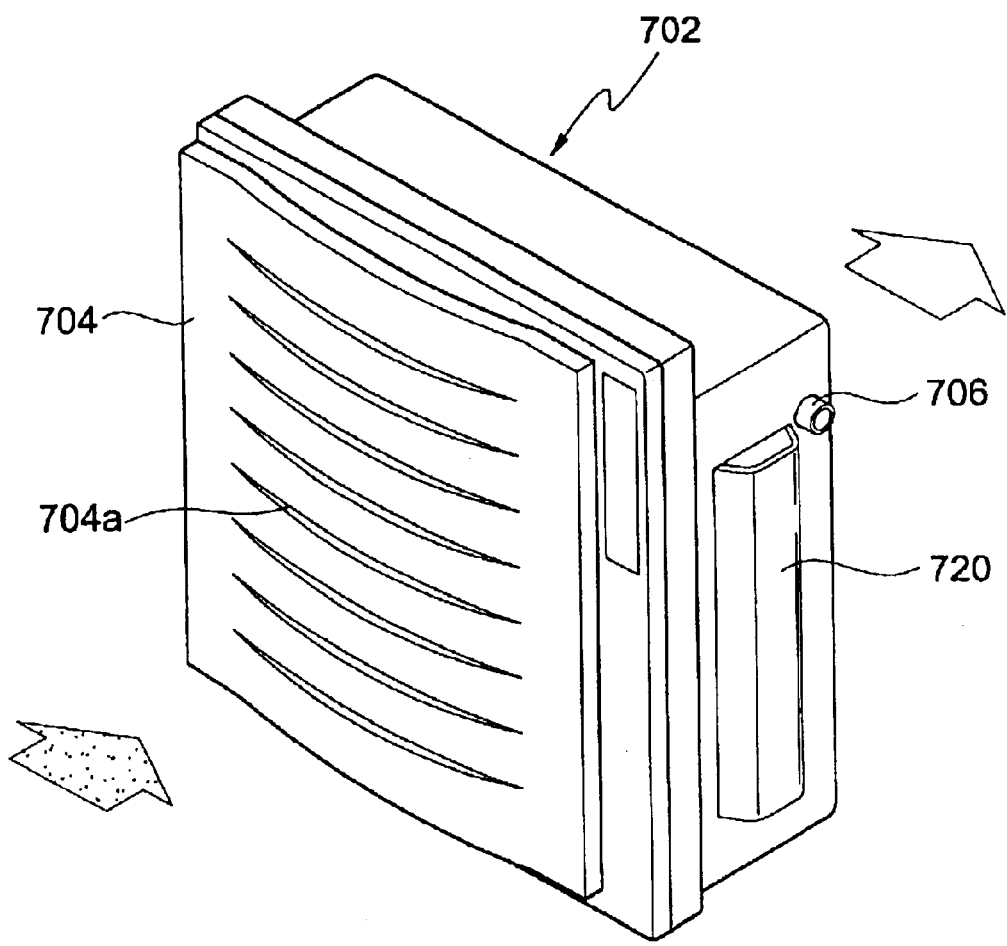
FIG. 7 is a perspective view of an air purifier, according to a second embodiment of the present invention.
Figure 8B:
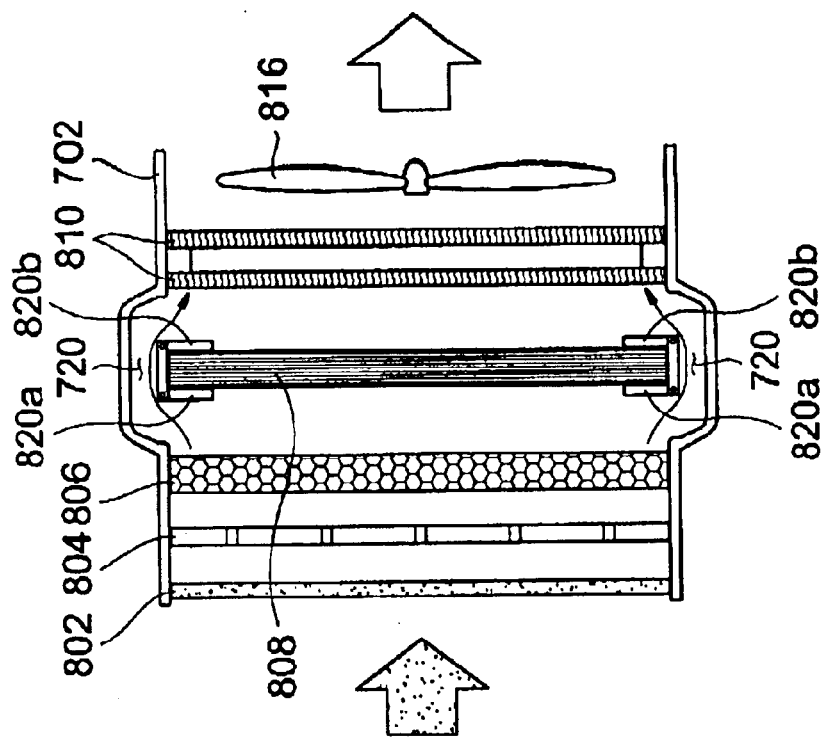
FIGS. 8A and 8B are plan sectional views illustrating the construction and operation of the air purifier of FIG. 7.
Figure 8A:
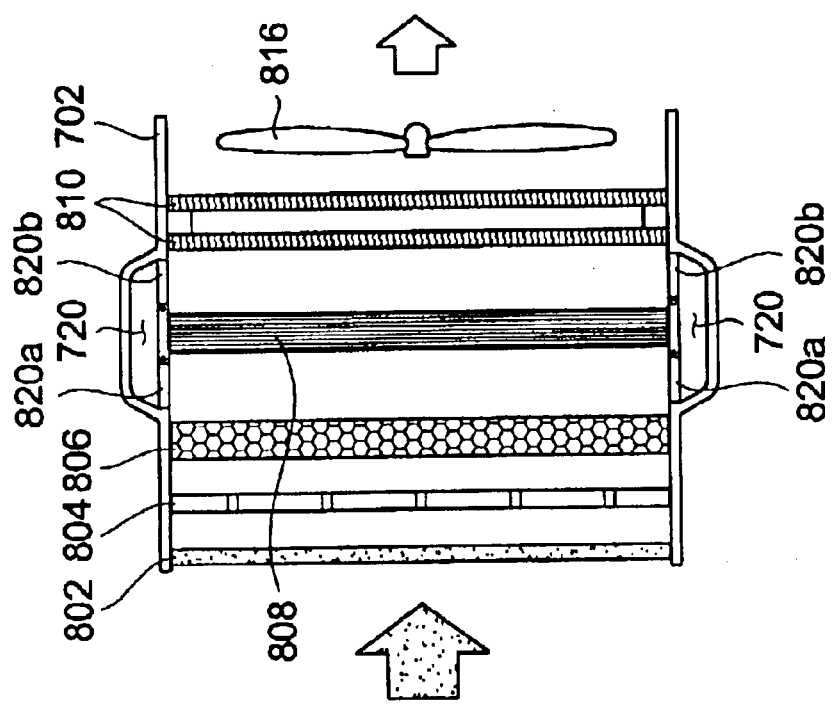
Figure 9:
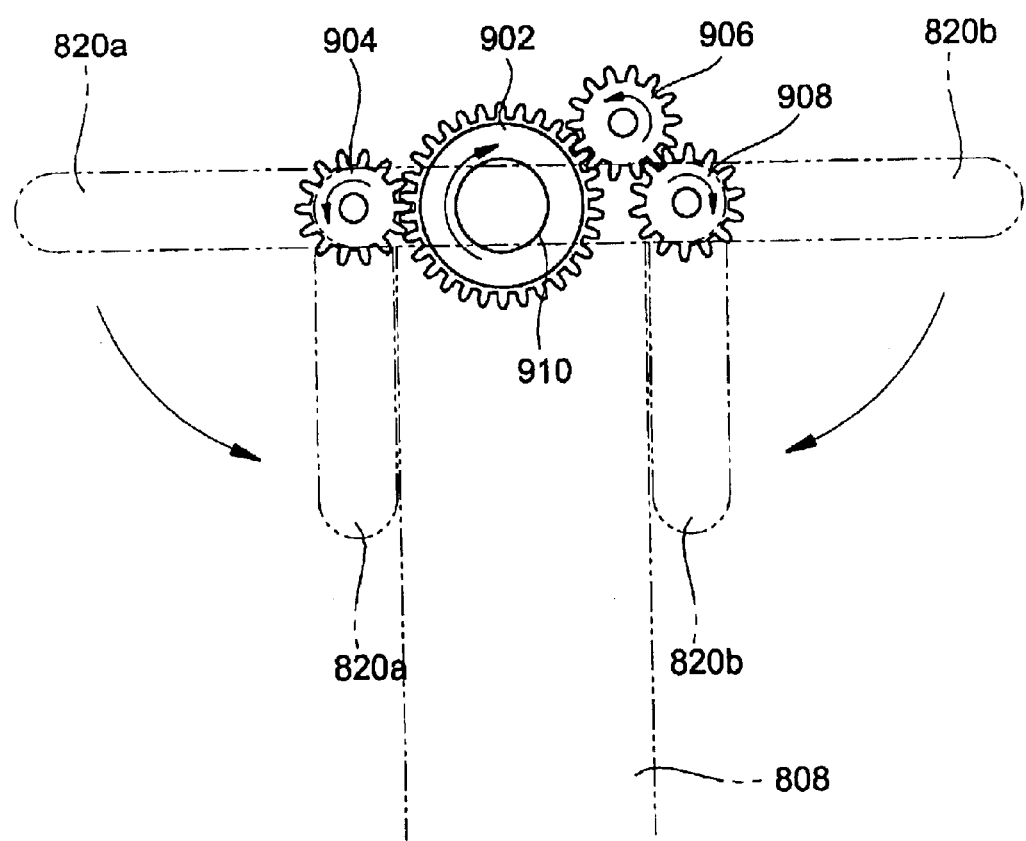
FIG. 9 is a view of a door control mechanism used to open or close doors provided in the air purifier at positions around a HEPA filter.

FIGS. 7 to 9 are views of an air purifier provided with a bypass passage on a main body thereof, according to a second embodiment of the present invention. As shown in FIG. 7, which is a perspective view of the air purifier, the main body 702 of the air purifier is equipped with a cover 704 at a front surface thereof, in which the cover 704 is formed with a plurality of air suction slits 704a so that external air is sucked into the main body 702. That is, through the air suction slits 704a, contaminated air is sucked into the main body 702, which functions to remove contaminants such as dust particles, hazardous components, and offensive odors, thus purifying the contaminated air. The purified air is discharged through an air exhaust port (not shown), positioned at a back surface of the main body 702, to the outside of the air purifier. At a side surface of the main body 702, a contamination level sensor 706 is mounted to determine the contamination level of air inside a room having the air purifier. A bypass passage 720 is formed on each side of the main body 702 to bypass air in the main body 702.

FIGS. 8A and 8B are plan sectional views illustrating the construction and operation of the air purifier of FIG. 7. As shown in FIG. 8A, the air purifier of the second embodiment of the present invention also includes a pre-filter 802, an ionizer 804, a collector 806, a HEPA filter 808, and photocatalytic filters 810, sequentially disposed from the front to the back of the main body 702. Further, a fan 816 is installed at the very rear of the main body 702 to circulate air forcibly from the front to the back of the main body 702.

As shown in FIGS. 8A and 8B, two doors 820a and 820b are provided in the main body 702 at positions around each side end of the HEPA filter 808 to open or close an associated bypass passage 720. When the four doors 820a and 820b provided at both side ends of the HEPA filter 808 are closed, air passes through the HEPA filter 808 in the main body 702, so that microparticles such as fine dust, bacteria or fungi, are removed from the air by the HEPA filter 808. However, when the contamination level of room air is sufficiently reduced to be lower than a predetermined reference level, due to a repeated air purifying process of the air purifier, the four doors 820a and 820b are opened as shown in FIG. 8B, thus allowing a large percentage of air to pass through the bypass passages 720 to reach the photocatalytic filters 810, without passing through the HEPA filter 808. In such a case, the HEPA filter 808 has a microstructure, generating high resistance against air currents, so that a large percentage of air flowing from the collector 806 is naturally guided to the bypass passages 720.

FIG. 9 is a view of a door control mechanism used to open or close two doors provided at positions around each side end of the HEPA filter. As shown in FIG. 9, the door control mechanism is fabricated by using a plurality of gears to rotate the two doors 820a and 820b in opposite directions. That is, the door control mechanism includes a first gear 902, a second gear 904, a third gear 906 and a fourth gear 908. The first gear 902 is a drive gear on a rotating shaft 910 and connected to a drive motor (not shown), and transmits rotating force of the motor to the door control mechanism. The second gear 904 engages with the first gear 902 to rotate the first door 820a, while the fourth gear 908 cooperates with the first gear 902 through the third gear 906 to rotate the second door 820b. When the first gear 902 is rotated by the motor in a direction as shown by the arrow of FIG. 9, the second gear 904 is rotated in the reverse direction to open the first door 820a. In such a case, the fourth gear 908 is rotated in the same direction as that of the first gear 902 to open the second door 820b.

In a brief description, the air purifiers of FIGS. 2 to 9 are designed such that a HEPA filter or bypass passages are opened when the contamination level of room air is sufficiently reduced to be lower than a predetermined reference level. In the air purifiers, the HEPA filter or the bypass passages may be opened during a sleep mode or a deodorizing mode. While a person is asleep, particularly at night, in a room having the air purifier, the air purifier is required to remove harmful gases, such as carbon dioxide or ammonia gas, from the air. In such a case, the air purifier is preferably controlled to perform a sleep mode in which the HEPA filter or the bypass passages are opened to allow the air purifier to quickly perform a harmful gas filtering process while attenuating operational noise disturbing the user in his/her sleep. In addition, when a deodorizing mode is selected, to remove odors from room air, the HEPA filter or the bypass passages are opened to increase the pressure of circulated air in the air purifier, thus allowing the air purifier to perform quick circulation of air and quick deodorization of the room air.

As is apparent from the above description, the present invention provides an air purifier designed to directly discharge air to a room without forcing the air to pass through a HEPA filter when the level of contaminations in the air, such as dust particles, is determined to be sufficiently low. The air purifier thus minimizes air pressure loss and attenuates operational noise caused by the HEPA filter, through which the air passes.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of purifying air, comprising:
   passing the air through a main body defining an air passage therein to allow sucked air to pass therethrough prior to being discharged;
   passing the air through a first filter installed in said main body to be switched between a closed state and an open state, said first filter removing contaminants from the sucked air in the closed state and allowing the sucked air to pass through the air passage in the open state; and
   wherein a linear moving action of the first filter or a rotating action of the first filter around at least one rotating shaft switches the first filter between said closed state and said open state.

2. The method of claim 1, wherein said first filter is a high-efficiency particulate air (HEPA) filter to remove micro-contaminants from the sucked air.

3. The method of claim 1, further comprising using at least one drive unit to rotate said first filter.

4. The method of claim 1, further comprising:
   using at least one drive unit to move said first filter; and
   using a converting unit to convert the rotating action of said drive unit into the linear moving action of said first filter.

5. The method of claim 4, wherein said converting unit comprises a rack and a pinion.

6. The method of claim 1, further using a second filter installed behind said first filter to remove harmful gases and odors from the sucked air passing through the air passage.

7. The method of claim 6, further utilizing a contamination level sensor to determine a contamination level of air to be processed, and switching said first filter into the open state when a sensed contamination level of the air is lower than a predetermined reference level, thus allowing the second filter to remove harmful gases and odors from the air.

8. The method of claim 6, including activating a sleep mode to remove harmful gases and odors from the air while a user is asleep, and switching said first filter into the open state when the sleep mode is activated, thus allowing the second filter to remove harmful gases and odors from the air.

9. The method of claim 6, including activating a deodorizing mode to remove odors from the air, and switching said first filter into the open state when the deodorizing mode is activated, thus allowing the second filter to remove odors from the air.

10. The method of claim 1, further comprising:
    using a second filter to collect large dust particles;
    using a third filter to charge dust particles electrically and to collect the charged dust particles by electrostatic attraction; and
    using a fourth filter to remove odors from the air,
    wherein the first filter is positioned between the third filter and the fourth filter.

11. An air purifier, comprising:
    a main body defining an air passage therein to allow sucked air to pass therethrough prior to being discharged; and
    a first filter installed in said main body to be switched between a closed state and an open state, said first filter removing contaminants from the sucked air in the closed state and allowing the sucked air to pass through the air passage in the open state,
    wherein said first filter is installed in said main body such that a linear moving action of the first filter switches the first filter between said closed state and said open state.

12. The air purifier as defined in claim 11, wherein said first filter is a high-efficiency particulate air (HEPA) filter to remove micro-contaminants from the sucked air.

13. The air purifier of claim 12, further comprising a door control mechanism having a plurality of gears to rotate two doors, the doors being disposed proximate to opposite sides of the HEPA filter, opening the doors.

14. The air purifier as defined in claim 11, wherein said first filter is installed in said main body such that the first filter is rotated around at least one rotating shaft to be switched between said closed state and said open state.

15. The air purifier as defined in claim 14, further comprising at least one drive unit to rotate the at least one rotating shaft, which rotates said first filter.

16. The air purifier as defined in claim 11, further comprising:
    at least one drive unit to move said first filter; and
    a converting unit to convert a rotating action of said at least one drive unit into the linear moving action of said first filter.

17. The air purifier as defined in claim 16, wherein said converting unit comprises a rack and a pinion.

18. The air purifier as defined in claim 11, further comprising:
    a second filter installed behind said first filter to remove harmful gases and odors from the sucked air passing through the air passage.

19. The air purifier as defined in claim 18, further comprising:
    a contamination level sensor to determine a contamination level of air to be processed by the air purifier,
    wherein said first filter is switched into the open state when a sensed contamination level of the air is lower than a predetermined reference level, thus allowing the second filter to remove harmful gases and odors from the air.

20. The air purifier as defined in claim 18, wherein said first filter is switched into the open state so as to allow the second filter to remove harmful gases and odors from the air when a user is asleep.

21. The air purifier as defined in claim 18, wherein said first filter is switched into the open state so as to allow the second filter to remove odors from the air.

22. The air purifier as defined in claim 11, further comprising:
- a second filter to collect large dust particles;
- a third filter to charge dust particles electrically and to collect the charged dust particles by electrostatic attraction; and
- a fourth filter to remove odors from the air,
- wherein the first filter is positioned between the third filter and the fourth filter.

23. The air purifier of claim 11, further comprising a fan installed at a rear of the main body, to circulate air forcibly from a front to a back of the main body.

24. An air purifier, comprising:
- a main body defining an air passage therein to allow sucked air to pass therethrough prior to being discharged, with a bypass passage being formed in said main body so that the bypass passage is opened or closed by a door; a first filter installed in said main body to remove contaminants from the sucked air,
- wherein the sucked air passes through the first filter prior to being discharged from the main body when the door is closed to form a closed state, and passes through the bypass passage prior to being discharged from the main body when the door is opened to form an open state, and
- wherein said first filter is installed in said main body such that a linear moving action of the first filter switches the first filter between said closed state and said open state.

25. The air purifier as defined in claim 24, wherein said first filter is a high-efficiency particulate air (HEPA) filter capable of removing micro-contaminants from the sucked air.

26. The air purifier as defined in claim 24, wherein said bypass passage is formed at each side of said first filter.

27. The air purifier as defined in claim 24, further comprising:
- a second filter installed behind said first filter to remove harmful gases and odors from the sucked air passing through the air passage.

28. The air purifier as defined in claim 27, further comprising:
- a contamination level sensor to determine a contamination level of the air to be processed by the air purifier,
- wherein said door is opened when a sensed contamination level of the air is lower than a predetermined reference level, thus allowing the second filter to remove harmful gases and odors from the air.

29. The air purifier as defined in claim 27, wherein said first filter is switched into the open state so as to allow the second filter to remove harmful gases and odors from the air when a user is asleep.

30. The air purifier as defined in claim 27, wherein said first filter is switched into the open state so as to allow the second filter to remove odors from the air.

31. The air purifier as defined in claim 24, further comprising:
- a second filter to collect large dust particles;
- a third filter to charge dust particles electrically and to collect the charged dust particles by electrostatic attraction; and
- a fourth filter to remove odors from the air, wherein the first filter is positioned between the third filter and the fourth filter.

* * * * *